United States Patent [19]
Yamagiwa et al.

[11] Patent Number: 5,984,517
[45] Date of Patent: Nov. 16, 1999

[54] INJECTION SCREW

[75] Inventors: Yoshitoshi Yamagiwa; Kiyoto Takizawa; Takayoshi Shioiri; Yasuhiko Takeuchi; Michihiro Tatsuno, all of Nagano-ken, Japan

[73] Assignee: Nissei Plastic Industrial Co., Ltd., Nagano-Ken, Japan

[21] Appl. No.: 08/998,142

[22] Filed: Dec. 24, 1997

[30] Foreign Application Priority Data

Dec. 27, 1996 [JP] Japan ...................................... 8-350267

[51] Int. Cl.⁶ ............................... B29B 7/42; B29C 45/60
[52] U.S. Cl. .............................................................. 366/89
[58] Field of Search ............................... 366/79, 89, 318, 366/323

[56] References Cited

U.S. PATENT DOCUMENTS

| | | | |
|---|---|---|---|
| 3,431,599 | 3/1969 | Fogelberg | 366/89 |
| 3,602,950 | 9/1971 | Bielfeldt | 366/89 |
| 3,902,704 | 9/1975 | Ishibashi et al. | 366/79 |
| 3,992,500 | 11/1976 | Kruder et al. | 366/89 |
| 4,118,164 | 10/1978 | Wenger et al. | 366/79 |
| 4,255,379 | 3/1981 | Frankland, Jr. | 366/89 |
| 4,944,906 | 7/1990 | Colby et al. | 366/89 |
| 4,994,223 | 2/1991 | Hestehave et al. | 366/89 |

*Primary Examiner*—Tony G. Soohoo
*Attorney, Agent, or Firm*—Weingarten, Schurgin, Gagnebin & Hayes LLP

[57] ABSTRACT

An injection screw comprise a rear end to a front end of an effective length of the screw compartmented in the order of a feed zone, a compression zone and a metering zone, wherein the metering zone is constituted by the first metering zone, the second metering zone and the relaxation zone. A root diameter of the second metering zone is formed in a smaller diameter than a root diameter of the first metering zone and a screw channel depth is set deeper than a screw channel depth of the first metering zone. Variations in a resin temperature at injecting is solved and melting and kneading through a entire screw further are improved by only partial changing of the configuration of the metering zone.

4 Claims, 2 Drawing Sheets

INJECTION SCREW

BACKGROUND OF THE INVENTION

1. Field of the Invention

This invention relates to an injection screw in a heating cylinder of an injection apparatus used in molding of synthetic resin.

2. Background Art

In an injection screw, a rear end to a front end of an effective length of the screw is divided in order into a feed zone, a compression zone and a metering zone, and a screw (a flight) with a same outside diameter formed successively across each zone thereof. Moreover, although as a screw pitch, normally, a pitch (P)/an outside diameter (D)=1 is used, with the objective of improving the plastificating efficiency or the like a root diameter of the screw of the metering zone is formed in a larger diameter than a diameter of the feed zone, and a root diameter of the screw of the compression zone therebetween is enlarged in order from the feed zone toward the metering zone, thereby to be tapered.

Each zone thereof has the functions as follows: melting of a pelletized molding material, that is, a resin in a heating cylinder is caused by both a band heater mounted on an outer peripheral of the heating cylinder and heat generated by shearing of the resin caused by rotation of the screw, and in the feed zone, the pelletized molding material fell in a rotating screw channel from a hopper is fed forwardly and is preheated simultaneously, and the resin is transferred to the compression zone while being melting by both the exterior heating and the heat generated by shearing of the resin: in the compression zone, the semi-molten resin is melted and kneaded by the exterior heating and shearing action while being compressed by the tapered channel to be sent to the metering zone: and in the metering zone, the molten resin is kneaded further completely and is made uniform to flow out from the screw head into a head section of the heating cylinder with uniform flowing speed.

Although it has been said that the resin plastificated by such an injection screw is made uniform by the exterior heating on the occasion of passing through the metering zone of which the screw channel depth is set most shallowly, resin can not be necessarily made uniform depending upon the set length of the metering zone, whereby variations in the resin temperature at injecting is occurred even in the standard screw as shown in FIG. 3.

Although it is thought to set the metering zone long, as a means for solving this problem, a time period that the plastificated resin is heated by the exterior heating becomes long due to the elongated metering zone, so that resin is heated more than required, and moreover, flowing resistance also is increased, resulting in the cause inducing generation of the excessive heat by shearing in the compression zone, thereby not only there being the risk that resin Is heated excessively, so that burning or the like are caused and resin is deteriorated, but also the new problems that the adverse effect is exerted on supplying of the pelletized molding material at the hopper, or the like being caused

SUMMARY OF THE INVENTION

This invention is designed to solve the previous problems described above, and the object of the invention is to provide an injection screw capable of solving the variations in the resin temperature at injecting and of further improving malting and kneading through the entire screw by only partial changing of the constitution of the metering zone.

This invention in accordance with the object described above is an injection screw comprising: a rear end to a front and of an effective length of a screw compartmented in the order of a feed zone, a compression zone and a metering zone; and a screw with a same outside diameter formed successively across each zone thereof, wherein said metering zone is constituted by a first metering zone and a second metering zone, a root diameter of said second metering zone being formed in a smaller diameter than a root diameter of the first metering zone and a screw channel depth of said second metering zone being set deeper than a screw channel depth of the first metering zone.

Moreover, this invention is to achieve that a boundary between said first metering zone and said second metering zone is provided as a relaxation zone and the screw channel volume is set within the range of 0.3 to 1.0 of a maximum shot weight, which can be calculated by (a sectional area of the screw x a screw stroke), of resin and the molten resin is allowed to stay in the second metering zone in which heat change is performed more efficiently, thereby the solution of the variations in the resin temperature and the improvement of promotion of plastification being performed, and is to achieve that, in some cases, a root diameter of a portion adjacent the screw head of the second metering zone is formed in a large diameter, so that the screw channel depth is set shallowly, thereby recompression being enabled.

It is preferable that the distribution of a screw pitch of said metering zone in this invention is within the range of a second metering zone length/a first metering zone length= 0.2 to 10, and it is preferable that the ratio of the screw channel depths is within the range of a second metering zone length/a first metering zone length=1.2 to 5.

DETAILED DESCRIPTION OF THE PREFERRED EMBODIMENTS

Figure 1:
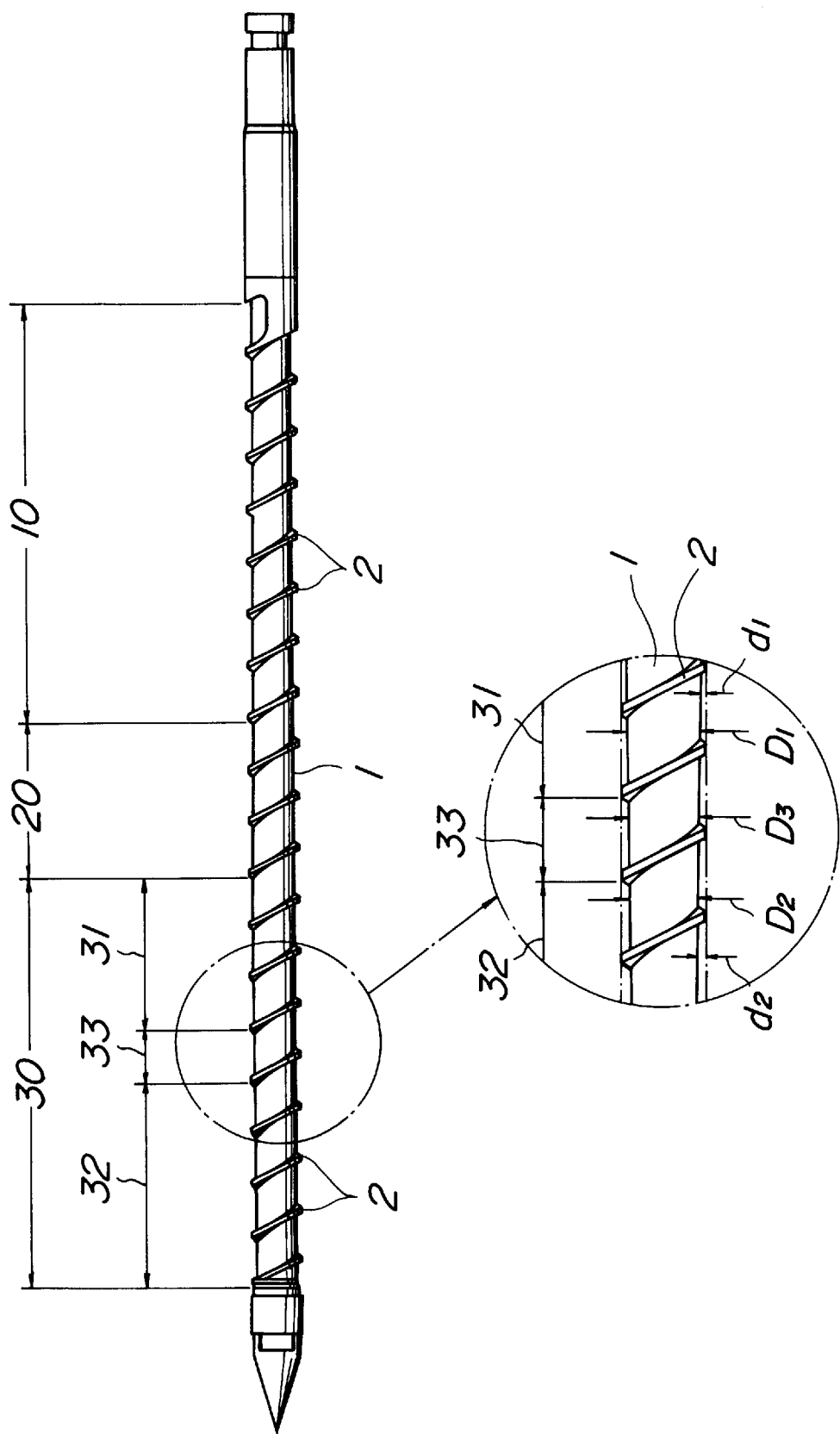
FIG. 1 is a side view and an enlarged view of an essential portion of an injection screw according to the invention.

In FIGS, numeral 1 designates an injection screw, which is constituted by a rear end to a front end of an effective length of the screw compartmented in the order of a feed zone 10, a compression zone 20 and a metering zone 30 and a screw 2 with a same outside diameter formed successively across each zone thereof. Moreover, as usually, the root diameter of the screw of the metering zone is formed in a larger diameter than the root diameter of the feed zone, and a root diameter of the screw of the compression zone therebetween is enlarged in order from the feed zone toward the metering zone, thereby to be tapered.

Said metering zone 30 is constituted by the first metering zone 31, the second metering zone 32 and the relaxation zone 33 located in a boundary therebetween, and the root diameter $D_2$ of the second metering zone 32 is formed in a smaller diameter than the root diameter $D_1$ of the first metering zone 31 and a screw channel depth $d_2$ is set deeper than a screw channel depth $d_1$ of the first metering zone 31 and the root diameter $D_3$ of the relaxation zone 33 located in the boundary therebetween is reduced in a small diameter toward the second metering zone 32 side, thereby to be tapered.

It is preferable that a length of the first metering zone 31 is set in a length approximately equal to the length of the compression zone 20, and a length of the second metering zone 32 including the relaxation zone 33 is formed in a longer length than the length of the first metering zone 31, and the effective length of the screw is set within the range not exceeded L/D=20 at P/D=1. Moreover, the relaxation zone 33 can be satisfied with a length corresponding to a screw pitch 1P, the molten resin compressed by the first metering zone 31 is released by the relaxation zone 33 to be relaxed to become to stay in the second metering zone 32.

Although the molten resin undergoes the shearing action by rotation of the screw and the exterior heating in also the second metering zone 32, the screw channel depth $d_2$ is deeper than the screw channel depth $d_1$ of the first metering zone, and the quantity of the resin filled between the screw channels is more than the quantity of in the first metering zone 31, whereby an overheated condition is not occurred even though the metering zone 30 is formed long as a whole, thereby the temperature of the molten resin being made uniform in cooperation with a secondary kneading action by the screw.

Moreover, depending upon resin as a molding material, although omitted in the drawings, the root diameter of the end adjacent the screw head of the second metering zone 32 is formed in a large diameter, so that the screw channel is formed in a relatively shallow depth, thereby also to be able to adjust to allow the plastificated resin at metering to flow out from the screw head with uniform speed.

Figure 2:
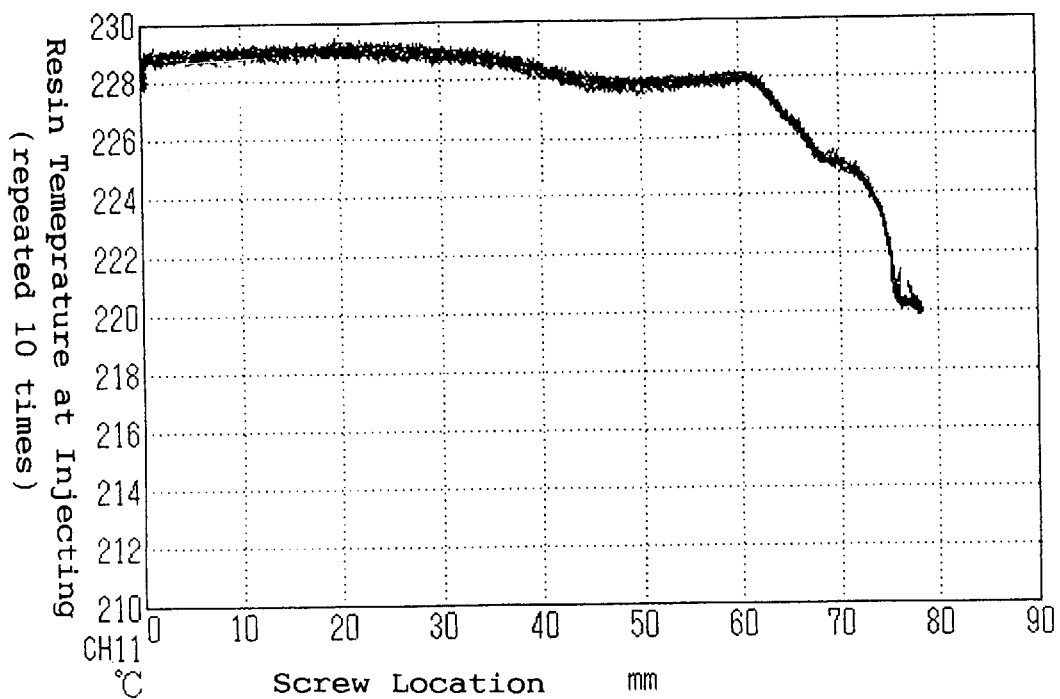
FIG. 2 is a view showing a temperature condition of a resin temperature at injecting according to utilizing an injection screw of the invention

FIG. 2 shows the resin temperature at injecting in the case where plastification of resin is performed utilizing the screw according to this invention, representing the vertical axis as the resin temperature and the traversal axis as the screw location, in which a resin temperature on the right end in the drawing is the temperature of the resin injected initially and a resin temperature on the left end in the drawing is the temperature of the resin injected finally.

However, the distribution of the screw pitches in the injection screw utilized in measurement of the temperature is according to the case where the first metering zone: the relaxation zone: the second metering zone is configured at 3:1:4, and the ratio of the depths of the screws is according to the case where the first metering zone: the second metering zone is configured at 1:2.

The temperature of the molten resin is obtained by measuring directly a temperature of the molten resin, said molten resin being injected from the nozzle by, at the point in time when the injection screw is rotated and retracted to 80 mm, defining the extremely advanced location of the screw as 0 mm, performing the metering and starting an injection and filling from the location.

As appeared from FIG. 2, there is no large variations in the resin temperature at injecting, and the differences between the upper and the lower are maintained within the range of 1° C.

Figure 3:
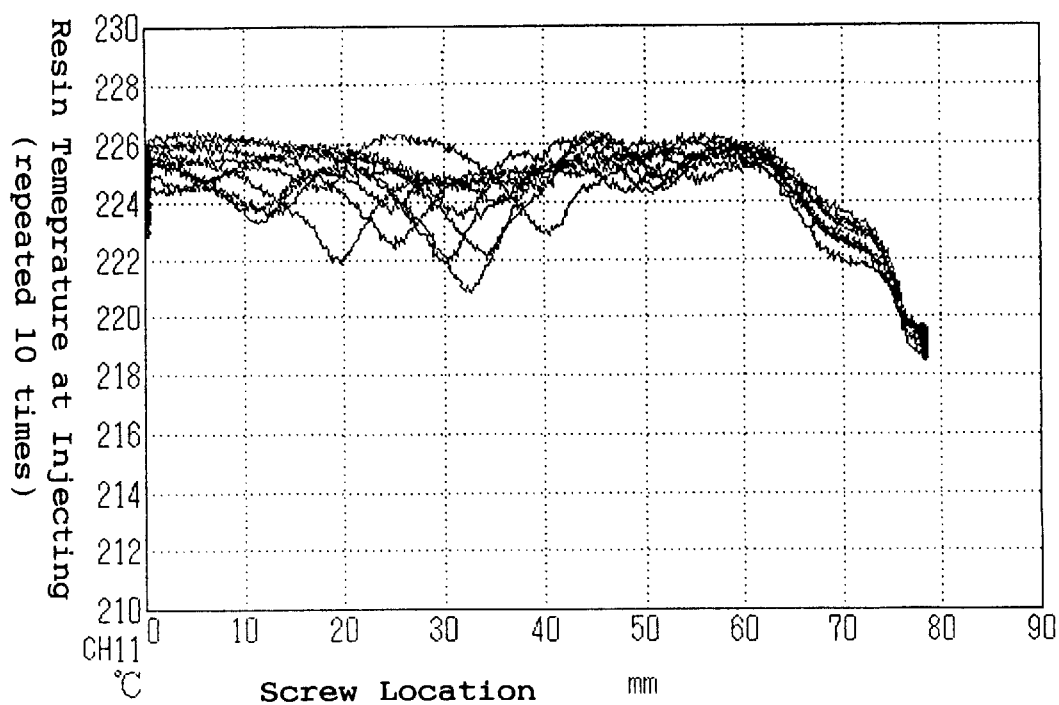
FIG. 3 is a view showing a temperature condition of a resin temperature at injecting according to utilizing a conventional standard-injection screw.

On the other hand, the resin temperature in the case according to the previous standard screw is changed every one shot as shown in FIG. 3. and in particular, the temperature variations in the portion (between 40 to 10 mm) which is thought to be most stabilized is largest and the resin temperature is substantially lower by 4° C. relatively.

This drop in the resin temperature affects plastification, and the temperature variations show that there is the difference in plastification of every one shot. Therefore, a stabilized molding can not be expected, even though molding conditions are set with a high accuracy.

However, in this invention, all the resin temperature at injecting of 10 shots are in the stabilized conditions, and moreover, plastification is improved by increasing in the temperature of the molten resin, so that conforming items with identical quality can be molded in every shot as shown in FIG. 2. Moreover, even though the metering zone is configured longer than the previous length, by forming the root diameter $D_2$ in the second metering zone 32 in a smaller diameter, the screw channel depth $d_2$ is formed deeper than the screw channel depth of the first metering zone 31, thereby heating by the exterior heating and the heat generated by shearing being released, and plastificating efficiency rather is greatly improved by synergy of conflicting action of the compression of the molten resin in the first metering zone 31 and the relaxation in the second metering zone 32, so that stability can be secured also for plastification at high speed.

Moreover, with the injection screw itself also, the constitution can not be sophisticated since partial changes of the metering zone is all that is needed, and a cost also can not be increased greatly, since there is no portion to be changed from the previous correspondence also in the correspondence between the heating cylinder and means for rotating the screw, and no specified means also in setting the molding conditions is required, thereby being convenient to utilize in injection molding extremely.

What is claimed is:

1. An injection screw comprising: a rear end to a front end of an effective length of a screw compartmented in the order of a feed zone, a compression zone and a metering zone; and a screw with a same outside diameter formed successively across each zone thereof, wherein said metering zone is constituted by a first metering zone, an adjacent relaxation zone, and a second metering zone adjacent the relaxation zone, a root diameter of said second metering zone being formed in a smaller diameter than a root diameter of the first metering zone and a screw channel depth of the second metering zone being set deeper than a screw channel depth of the first metering zone.

2. An injection screw according to claim 1, wherein a screw channel volume of said metering zone is set within a range of 0.3 to 1.0 of a maximum shot volume of the resin of a material.

3. An injection screw according to claim 2, wherein the root diameter of an outer portion of said second metering zone adjacent a screw head is formed having a larger diameter than that of the other portion of said metering zone, thereby the screw channel of the outer portion of said second metering zone is made shallow.

4. An injection screw according to claim 1, wherein the root diameter of an outer portion of said second metering zone adjacent a screw head is formed having a larger diameter than that of the other portion of said metering zone, thereby the screw channel of the outer portion of said second metering zone is made shallow.

* * * * *

UNITED STATES PATENT AND TRADEMARK OFFICE
CERTIFICATE OF CORRECTION

PATENT NO. : 5,984,517 Page 1 of 1
DATED : November 16, 1999
INVENTOR(S) : Yoshitoshi Yamagiwa et al.

It is certified that error appears in the above-identified patent and that said Letters Patent is hereby corrected as shown below:

<u>Column 1,</u>
Line 66, "malting", should read -- melting --;

<u>Column 2,</u>
Line 3, "and", should read -- end --;

<u>Column 4,</u>
Line 49, "claim 2", should read -- claim 1 --; and
Line 55, "claim 1", should read -- claim 2 --.

Signed and Sealed this

Twenty-fifth Day of December, 2001

Attest:

JAMES E. ROGAN
*Attesting Officer*    *Director of the United States Patent and Trademark Office*